(12) United States Patent
Sepehrnoori et al.

(10) Patent No.: US 10,914,140 B2
(45) Date of Patent: Feb. 9, 2021

(54) SYSTEMS, METHODS, AND APPARATUS FOR DISCRETE FRACTURE SIMULATION OF COMPLEX SUBSURFACE FRACTURE GEOMETRIES

(71) Applicant: Sim Tech LLC, Katy, TX (US)

(72) Inventors: Kamy Sepehrnoori, Austin, TX (US); Yifei Xu, Austin, TX (US); Wei Yu, College Station, TX (US); Jijun Miao, Katy, TX (US)

(73) Assignees: Sim Tech LLC, Katy, TX (US); Board of Regents, The University of Texas System, Austin, TX (US)

( * ) Notice: Subject to any disclaimer, the term of this patent is extended or adjusted under 35 U.S.C. 154(b) by 447 days.

(21) Appl. No.: 15/945,544

(22) Filed: Apr. 4, 2018

(65) Prior Publication Data

US 2019/0309603 A1 Oct. 10, 2019

(51) Int. Cl.
| | | |
|---|---|---|
| *G06F 111/10* | (2020.01) | |
| *E21B 41/00* | (2006.01) | |
| *E21B 49/00* | (2006.01) | |
| *G06F 30/20* | (2020.01) | |
| *E21B 43/26* | (2006.01) | |

(52) U.S. Cl.
CPC .......... *E21B 41/0092* (2013.01); *E21B 49/00* (2013.01); *G06F 30/20* (2020.01); *E21B 43/26* (2013.01); *G06F 2111/10* (2020.01)

(58) Field of Classification Search
CPC ...... G06F 30/20; G06F 2111/10; G06F 30/23; E21B 41/0092; E21B 49/00
USPC ....................................... 703/10, 2
See application file for complete search history.

(56) References Cited

U.S. PATENT DOCUMENTS

| | | |
|---|---|---|
| 5,992,519 A | 11/1999 | Ramakrishnan et al. |
| 6,313,837 B1 | 11/2001 | Assa et al. |
| 7,248,259 B2 | 7/2007 | Fremming |
| 7,478,024 B2 | 1/2009 | Gurpinar et al. |
| 7,523,024 B2 | 4/2009 | Endres et al. |
| 7,542,037 B2 | 6/2009 | Fremming |
| 7,565,278 B2 | 7/2009 | Li et al. |
| 2016/0131800 A1* | 5/2016 | Pecher .................... E21B 49/00 703/10 |
| 2019/0025460 A1* | 1/2019 | Mustapha ............... G06F 30/20 |

(Continued)

FOREIGN PATENT DOCUMENTS

| | | |
|---|---|---|
| WO | WO2004/049216 | 6/2004 |
| WO | WO2017/030725 | 2/2017 |

OTHER PUBLICATIONS

Jose Sergio de Araujo Cavalcante Filho et al., "Implementation of a preprocessor for embedded discrete fracture modeling in an IMPEC compositional reservoir simulator", 2015, SPE Reservoir Simulation Symposium, pp. 1-22.*

(Continued)

*Primary Examiner* — Juan C Ochoa
(74) *Attorney, Agent, or Firm* — Victor H. Segura

(57) ABSTRACT

Systems and methods for simulating subterranean regions having multi-scale, complex fracture geometries. Non-intrusive embedded discrete fracture modeling formulations are applied in conjunction with commercial simulators to efficiently and accurately model subsurface characteristics in regions having complex hydraulic fractures, complex natural fractures, or a combination of both.

21 Claims, 8 Drawing Sheets

(56) References Cited

U.S. PATENT DOCUMENTS

2019/0186255 A1* 6/2019 Mustapha ............... E21B 44/00

OTHER PUBLICATIONS

Graf and Therrien, A method to discretize nonplanar fractures for 3D subsurface flow and transport simulations, 2008, Int. J. Numer. Methods Fluids 56, pp. 2069-2090.*

Moinfar, Development of an efficient embedded discrete fracture model for 3D compositional reservoir simulation in fractured reservoirs, 2013, PhD dissertation, The University of Texas, Austin, Texas, pp. 1-232.*

* cited by examiner

○    Well location
⇔    Connection between matrix cell and matrix cell
←------→    NNC 1: Connection between fracture cell and matrix cell
←·······→    NNC 2: Connection between fracture cell and fracture cell for the same fracture
←— —→    NNC 3: Connection between fracture cell and fracture cell for different fractures

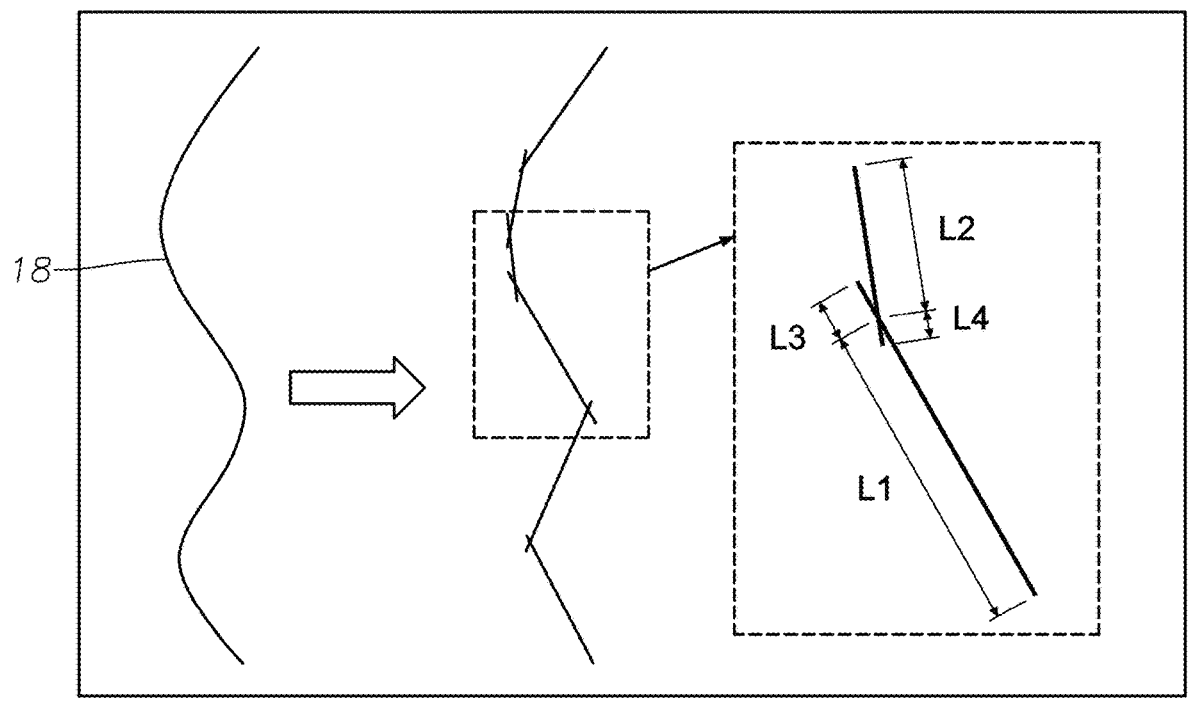
FIG. 5
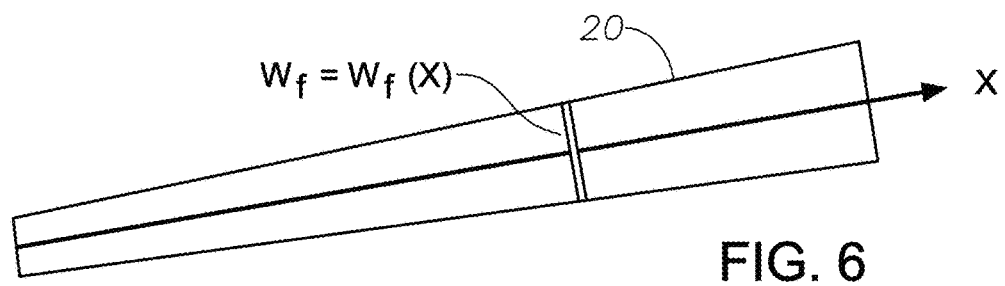
FIG. 6
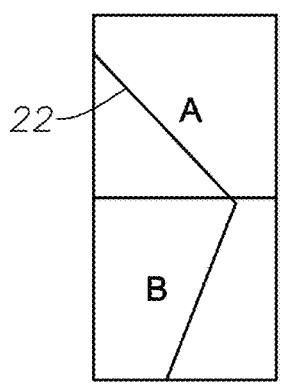 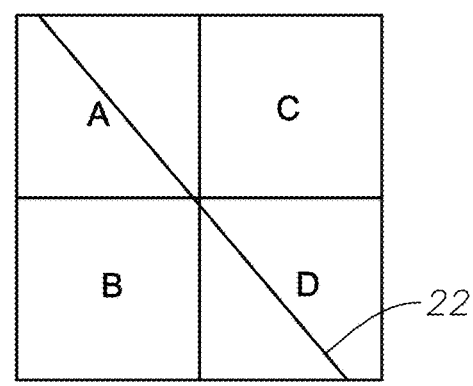
FIG. 7A          FIG. 7B

SYSTEMS, METHODS, AND APPARATUS FOR DISCRETE FRACTURE SIMULATION OF COMPLEX SUBSURFACE FRACTURE GEOMETRIES

FIELD OF THE INVENTION

The present disclosure relates generally to methods and systems for the simulation of subterranean regions with multi-scale complex fracture geometries, applying non-intrusive embedded discrete fracture modeling formulations with simulators.

BACKGROUND

The recovery of natural resources (e.g., oil, gas, geothermal steam, water, coal bed methane) from subterranean formations is often made difficult by the nature of the rock matrix in which they reside. Some formation matrices have very limited permeability. Such "unconventional" subterranean regions include shale reservoirs, siltstone formations, and sandstone formations. Technological advances in the areas of horizontal drilling and multi-stage hydraulic fracturing have improved the development of unconventional reservoirs. Hydraulic fracturing is a well stimulation technique used to increase permeability in a subterranean formation. In the fracturing process, a fluid is pumped into casing lining the wellbore traversing the formation. The fluid is pumped in at high pressure to penetrate the formation via perforations formed in the casing. The high-pressure fluid creates fissures or fractures that extend into and throughout the rock matrix surrounding the wellbore. Once the fractures are created, the fluids and gases in the formation flow more freely through the fractures and into the wellbore casing for recovery to the surface.

Since the presence of fractures significantly impacts the flow behavior of subterranean fluids and gases, it is important to accurately model or simulate the geometry of the fractures in order to determine their influence on well performance and production optimization. A conventional method for simulation of fluid flow in fractured reservoirs is the classic dual-porosity or dual-permeability model. This dual-continuum method considers the fractured reservoir as two systems, a fracture system and a matrix system. This method is suitable to model small-scale fractures with a high density. It cannot handle large scale fractures like those created during hydraulic fracturing operations. In addition, this method cannot deal with fractures explicitly. In order to model fractures explicitly, another method of local grid refinement (LGR) using a structured gridding technique is often used. A drawback of the LGR method is that it cannot handle complex fracture geometries due to limitations encountered with the structured gridding technique. The LGR method also requires a greater number of small grids near fractures, resulting in complex gridding issues and an expensive computational cost. In order to handle complex fracture geometries, a conventional technique of unstructured gridding is utilized. However, conventional reservoir simulators using unstructured gridding are limited to vertical fractures. As with the LGR method, the unstructured gridding method also needs a large number of small grids near complex fractures, resulting in complex gridding issues and an expensive computational cost. A challenging problem persists in modelling realistic fractures with three-dimensional complex geometries for reservoir analysis and production analysis. Thus, a need remains for improved techniques to easily, efficiently, and accurately model multi-scale complex subsurface fracture geometries.

SUMMARY

In view of the aforementioned problems and trends, embodiments of the present invention provide systems, methods and apparatuses for simulating a subterranean region having complex fracture geometries.

According to an aspect of the invention, a method for simulating a subterranean region having fracture geometries is disclosed. In this embodiment, data representing a subterranean region is obtained, the data comprising a matrix grid and fracture parameters. The obtained data is used to identify geometric interactions between fractures and matrix cells in the matrix grid. A new fracture cell is created for each segment of a fracture interacting with a matrix cell in the matrix grid. Physical properties are assigned to each new created fracture cell. Geometric relationships are assigned between the new created fracture cells and between the new created fracture cells and the matrix grid cells. Fluid flow transmissibility is calculated between the new created fracture cells and between the new created fracture cells and the matrix grid cells. A simulation of the subterranean region is generated using the calculated fluid flow transmissibility.

According to another aspect of the invention, a system for simulating a subterranean region having fracture geometries is disclosed. This embodiment includes at least one processor; a memory linked to the processor, the memory having instructions stored therein, which when executed by the processor cause the processor to perform functions including to: input data representing a subterranean region, the data comprising a matrix grid and fracture parameters; use the input data to identify geometric interactions between fractures and matrix cells in the matrix grid; create a new fracture cell for each segment of a fracture interacting with a matrix cell in the matrix grid; assign physical properties to each new created fracture cell; identify geometric relationships between the new created fracture cells and between the new created fracture cells and the matrix grid cells; calculate fluid flow transmissibility between the new created fracture cells and between the new created fracture cells and the matrix grid cells; and generate a simulation of the subterranean region using the calculated fluid flow transmissibility.

According to another aspect of the invention, a computer-readable medium is disclosed. In this embodiment, the computer-readable medium embodies instructions which when executed by a computer cause the computer to perform a plurality of functions, including functions to: input data representing a subterranean region, the data comprising a matrix grid, fracture parameters, and well parameters; identify in the data geometric interactions between fractures and matrix cells in the matrix grid; create a new fracture cell for each segment of a fracture interacting with a matrix cell in the matrix grid; assign physical properties to each new created fracture cell; identify non-neighboring connections between the new created fracture cells and between the new created fracture cells and the matrix grid cells; calculate fluid flow transmissibility between the new created fracture cells and between the new created fracture cells and the matrix grid cells; calculate a well index between the new created fracture cells and wellbore cells associated to the wellbore parameters; and generate a simulation of the subterranean region using the calculated fluid flow transmissibility and the calculated well index.

Other aspects of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present disclosure and should not be used to limit or define the claimed subject matter. The claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIG. 5, in accordance with some embodiments of the present disclosure, depicts a schematic of the modeling of a nonplanar fracture;

FIG. 6, in accordance with some embodiments of the present disclosure, depicts a 2D schematic of a fracture segment with varying aperture;

FIG. 7A, in accordance with some embodiments of the present disclosure, depicts a 2D schematic of small fracture segments in a matrix grid;

FIG. 7B, in accordance with some embodiments of the present disclosure, depicts another 2D schematic of small fracture segments in a matrix grid;

DETAILED DESCRIPTION

Figure 1A:
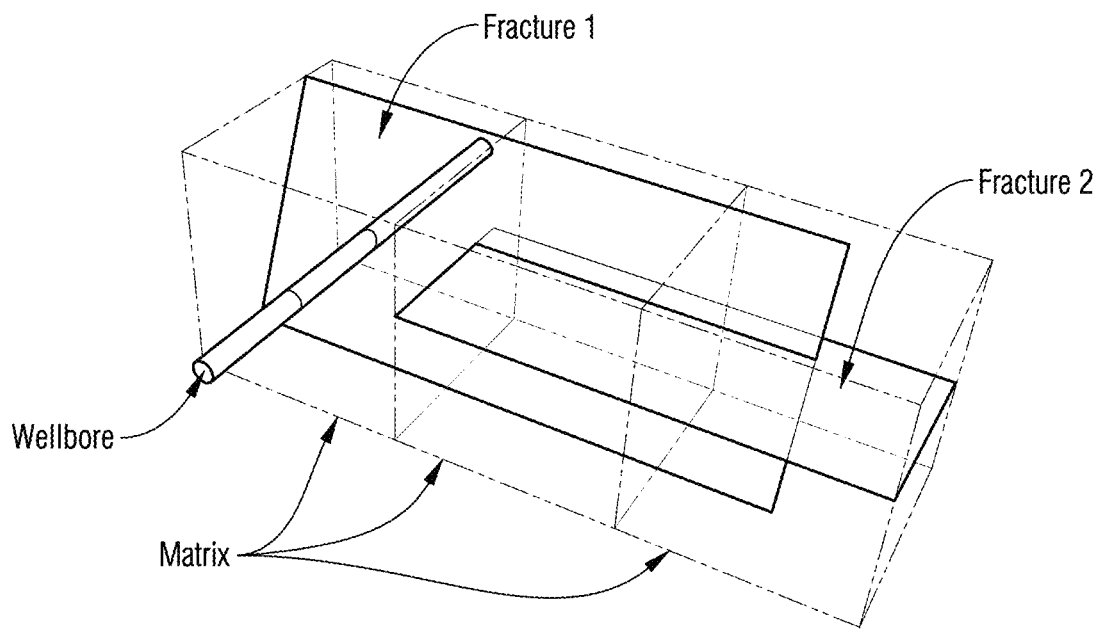
FIG. 1A, in accordance with some embodiments of the present disclosure, depicts a schematic of a subsurface physical domain representation using a formulation for handling complex fractures.

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are described in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

Embodiments of this disclosure present efficient techniques to model subterranean regions with complex geometries. Through non-neighboring connections (NNCs), an embedded discrete fracture modeling (EDFM) formulation is applied to data representing a subterranean region to accurately model or simulate formations with complex geometries such as fracture networks and nonplanar fractures. The data representing the subterranean region to be modeled may be obtained by conventional means as known in the art, such as formation evaluation techniques, reservoir surveys, seismic exploration, etc. The subterranean region data may comprise information relating to the fractures, the reservoir, and the well(s), including number, location, orientation, length, height, aperture, permeability, reservoir size, reservoir permeability, reservoir depth, well number, well radius, well trajectory, etc.

Some embodiments utilize data representing the subterranean region produced by conventional reservoir simulators as known in the art. For example, commercial oilfield reservoir simulators such as those offered by Computer Modelling Group Ltd. and Schlumberger Technology Corporation's ECLIPSE® product can be used with embodiments of this disclosure. Other examples of conventional simulators are described in U.S. Pat. No. 5,992,519 and WO2004/049216. Other examples of these modeling techniques are proposed in WO2017/030725, U.S. Pat. Nos. 6,313,837, 7,523,024, 7,248,259, 7,478,024, 7,565,278, and 7,542,037. Conventional simulators are designed to generate models of subterranean regions, producing data sets including a matrix grid, fracture parameters, well parameters, and other parameters related to the specific production or operation of the particular field or reservoir. Embodiments of this disclosure provide a non-intrusive application of an EDFM formulation that allows for insertion of discrete fractures into a computational domain and the use of a simulator's original functionalities without requiring access to the simulator source code. The embodiments may be easily integrated into existing frameworks for conventional or unconventional reservoirs to perform various analyses as described herein.

I. EDFM in Conventional Finite-Difference Reservoir Simulators

Embodiments of this disclosure employ an approach that creates fracture cells in contact with corresponding matrix cells to account for the mass transfer between continua. Once a fracture interacts with a matrix cell (e.g. fully or partially penetrating a matrix cell), a new additional cell is created to represent the fracture segment in the physical domain. The individual fractures are discretized into several fracture segments by the matrix cell boundaries. To differentiate the newly added cells from the original matrix cells, these additional cells are referred to herein as "fracture cells."

Figure 1B:
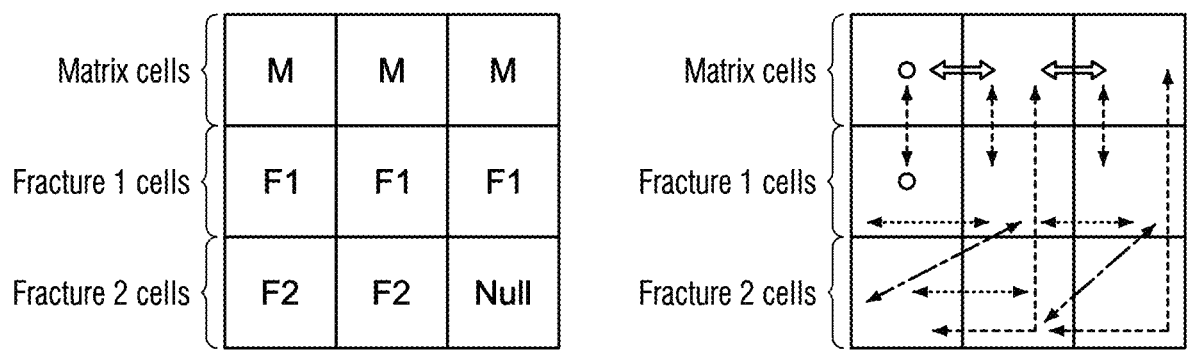
FIG. 1B, in accordance with some embodiments of the present disclosure, depicts a schematic of a computational domain using the formulation for handling the representation in FIG. 1A.

FIG. 1A depicts the procedure to add fracture cells in the EDFM using a simple case with only three matrix blocks and two fractures. FIG. 1A depicts the physical domain. FIG. 1B depicts the corresponding computational domain. In this exemplary embodiment, the physical domain includes three matrix cells, two inclined fractures and one wellbore. Before adding the two fractures, the computational domain includes three matrix cells: cell 1 (M), cell 2 (M), and cell 3 (M). After adding the fractures, the total number of cells will increase. Fracture 1 intersects three matrix cells and is discretized into three fracture segments. In the computational domain, three new extra fracture cells are added: cell 4 (F1), cell 5 (F1), and cell 6 (F1). Similarly, fracture 2 intersects two matrix cells and is discretized into two fracture segments. Two new extra fracture cells are added: cell 7 (F2) and cell 8 (F2). Since a structured grid is used in this exemplary embodiment, every row should have the same number of cells, therefore one Null cell is also introduced. The total number of cells increases from three (1×3=3) to nine (3×3=9). The depth of each fracture cell is defined as the depth of the centroid of the corresponding fracture segment. In some embodiments, physical properties (e.g., permeability, saturation, etc.) may be assigned to each fracture cell. For example, an effective porosity value may be assigned for each fracture cell to maintain the pore volume of the fracture segment:

$$\phi_f = \frac{S_{seg} w_f}{V_b}, \tag{1}$$

where $\phi_f$ is the effective porosity for a fracture cell, $s_{seg}$ is the area of the fracture segment perpendicular to the fracture aperture, $w_f$ is the fracture aperture, and $V_b$ is the bulk volume of the cells assigned for the fracture segment.

Some conventional reservoir simulators generate connections between the cells. After adding the new extra fracture cells, the EDFM formulation cancels any of these simulator-generated connections. The EDFM then identifies and defines the NNCs between the added fracture cells and matrix cells. NNCs are introduced to address flow communication between cells that are physically connected but not neighboring in the computational domain. The EDFM calculates the transmissibility based on the following definitions:

a) NNC 1: connection between fracture cell and matrix cell
b) NNC 2: connection between fracture cell and fracture cell for the same fracture
c) NNC 3: connection between fracture cell and fracture cell for different fractures.

These different types of NNCs are illustrated in FIG. 1B. The cells in each NNC pair are connected by transmissibility factors. In addition to these NNCs, the connections between fractures and wells are also introduced by the EDFM. When a fracture segment intersects the wellbore trajectory (as shown in FIG. 1A), a corresponding fracture cell is defined as a wellblock by adding a well location for this cell as shown in FIG. 1B.

This general procedure may be implemented with conventional reservoir simulators or with other applications that generate similar data sets. As a non-intrusive method, the calculations of connection factors, including NNC transmissibility factors and a fracture well index, depend on the gridding, reservoir permeability, and fracture geometries. Embodiments of this disclosure apply a preprocessor to provide the geometrical calculations. Taking the reservoir and gridding information as inputs, the preprocessor performs the calculations disclosed herein and generates an output of data values corresponding to fracture locations, connectivity parameters, geometry parameters, the number of extra grids, the equivalent properties of these grids, transmissibility factors, and NNC pairings. Embodiments of the preprocessor may be developed using conventional programming languages (e.g., PYTHON™, FORTRAN™, C, C++, etc.). Additional description regarding the preprocessor is provided below.

II. Calculation of NNC Transmissibility and Fracture Well Index

Figure 2:
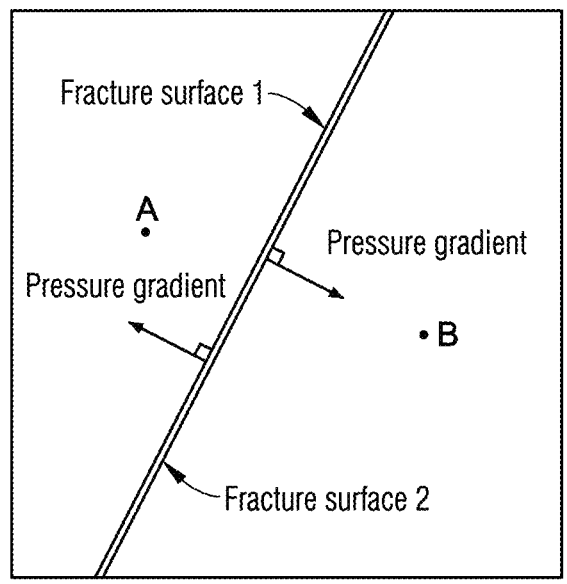
FIG. 2, in accordance with some embodiments of the present disclosure, depicts a schematic of a connection between a fracture cell and a matrix cell.

Matrix-Fracture Connection. The NNC transmissibility factor between a matrix and fracture segment depends on the matrix permeability and fracture geometry. When a fracture segment fully penetrates a matrix cell, if one assumes a uniform pressure gradient in the matrix cell and that the pressure gradient is normal to the fracture plane as shown in FIG. 2, the matrix-fracture transmissibility factor is $$T_{f\text{-}m} = \frac{2A_f(K \cdot \vec{n}) \cdot \vec{n}}{d_{f\text{-}m}}, \tag{2}$$

where $A_f$ is the area of the fracture segment on one side, K is the matrix permeability tensor, $\vec{n}$ is the normal vector of the fracture plane, $d_{f-m}$ is the average normal distance from matrix to fracture, which is calculated as $$d_{f-m} = \frac{\int_V x_n dV}{V}, \quad (3)$$

where V is the volume of the matrix cell, dV is the volume element of matrix, and is the distance from the volume element to the fracture plane. A more detailed derivation of Equation (2) is provided in Appendix A.

If the fracture does not fully penetrate the matrix cell, the calculation of the transmissibility factor should take into account that the pressure distribution in the matrix cell may deviate from the previous assumptions. In order to implement a non-intrusive process, one can assume that the transmissibility factor is proportional to the area of the fracture segment inside the matrix cell.

Figure 3:
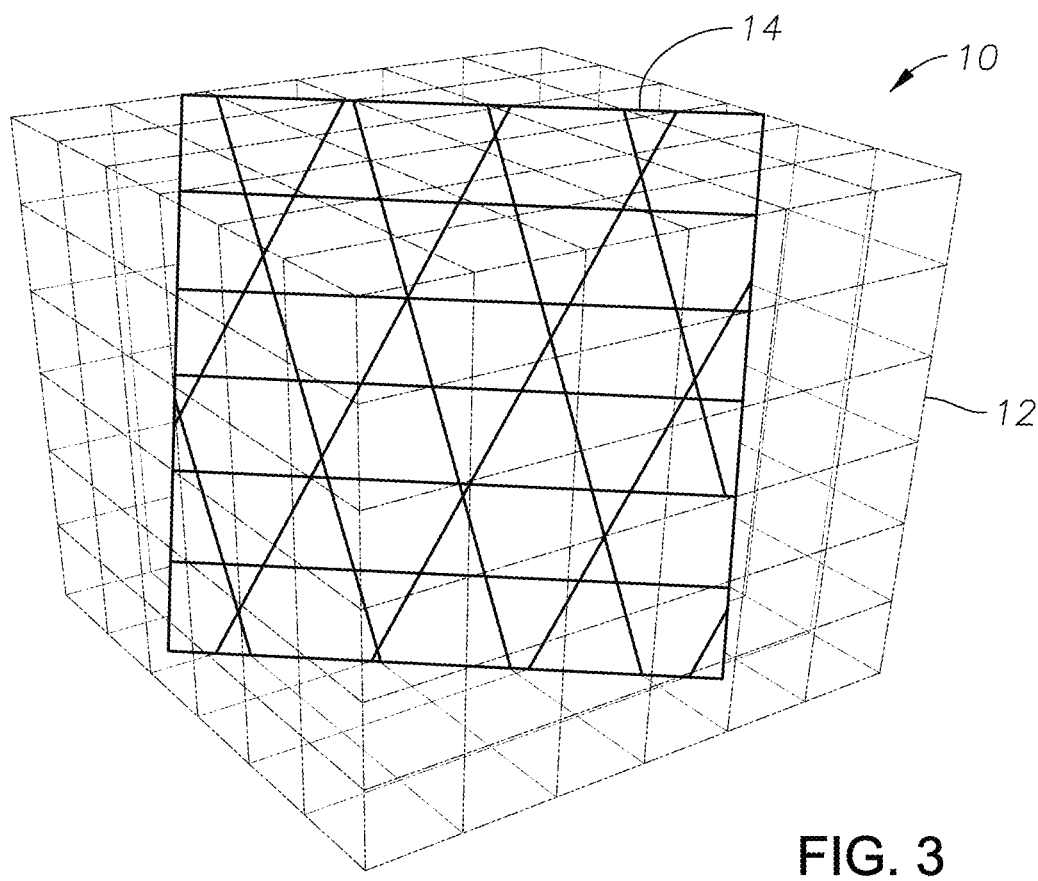
FIG. 3, in accordance with some embodiments of the present disclosure, depicts a 3D reservoir model using a structured grid with an inclined fracture.

Connection between Fracture Segments in an Individual Fracture. FIG. 3 depicts a 3D reservoir model 10 using a structured grid 12, with one inclined fracture 14. As depicted, a fracture 12 can be discretized into many small fracture segments by the boundary of the matrix cells. Each fracture segment can have a different geometric shape, including trilateral, quadrilateral, pentagons, and hexagons. Thus, the connection between these segments is a 2D unstructured grid problem. To facilitate the implementation of conventional simulators, a simplified approximation may be adopted. The transmissibility factor between a pair of neighboring segments, 1 and 2, is evaluated using a two-point flux approximation scheme as $$T_{seg} = \frac{T_1 T_2}{T_1 + T_2}, \quad (4a)$$

$$T_1 = \frac{k_f A_c}{d_{seg1}}, T_2 = \frac{k_f A_c}{d_{seg2}}, \quad (4b)$$

where $k_f$ is the fracture permeability, $A_c$ is the area of the common face for these two segments, $d_{seg1}$ and $d_{seg2}$ are the distances from the centroids of segments 1 and 2 to the common face, respectively. This two-point flux approximation scheme may lose some accuracy for 3D cases where the fracture segments may not form orthogonal grids. When the flow in the fracture plane becomes vital for the total flow, a multi-point flux approximation may be applied. In some embodiments, the EDFM preprocessor calculates the phase independent part of the connection factors, and the phase dependent part is calculated by the simulator.

Figure 4A:
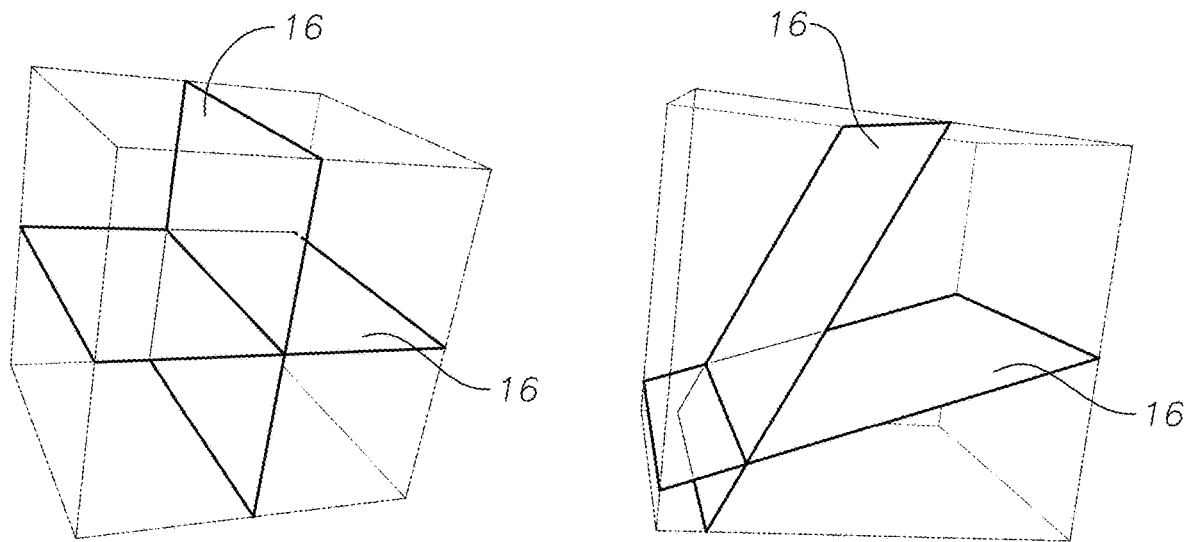
FIG. 4A, in accordance with some embodiments of the present disclosure, depicts a schematic of a fracture intersection with all subsegments having similar dimensions.
Figure 4A:
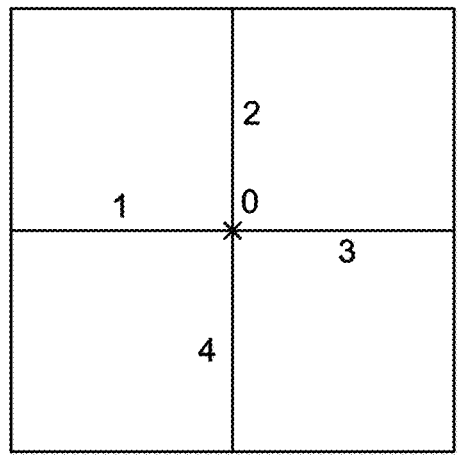
Figure 4B:
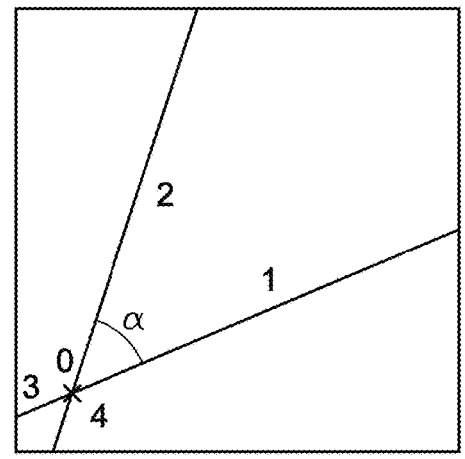
FIG. 4B, in accordance with some embodiments of the present disclosure, depicts a schematic of a fracture intersection with a high contrast between the subsegment areas.

Fracture Intersection. FIG. 4A and FIG. 4B depict sample fracture 16 intersections in a 3D view (upper) and 2D view (lower). At intersections, the fractures 16 can be divided into two subsegments. In FIG. 4A, all of the subsegments have similar dimensions. In FIG. 4B, there is high contrast between areas of the subsegments. A transmissibility factor is assigned between intersecting fracture segments to approximate the mass transfer at the fracture intersection. The transmissibility factor is calculated as $$T_{int} = \frac{T_1 T_2}{T_1 + T_2}, \quad (5a)$$

$$T_1 = \frac{k_{f1} w_{f1} L_{int}}{d_{f1}}, T_2 = \frac{k_{f2} w_{f2} L_{int}}{d_{f2}}, \quad (5b)$$

where $L_{int}$ is the length of the intersection line. $d_{f1}$ and $d_{f2}$ are the weighted average of the normal distances from the centroids of the subsegments (on both sides) to the intersection line.

In FIGS. 4A and 4B, $$d_{f1} = \frac{\int_{S_1} x_n dS_1 + \int_{S_3} x_n dS_3}{S_1 + S_3} \quad (6)$$

$$d_{f2} = \frac{\int_{S_2} x_n dS_2 + \int_{S_4} x_n dS_4}{S_2 + S_4}, \quad (7)$$

where $dS_i$ is the area element and $S_i$ is the area of the fracture subsegment i. $x_n$ is the distance from the area element to the intersection line. It is not necessary to perform integrations for the average normal distance. Since the subsegments are polygonal, geometrical processing may be used to speed up the calculation.

Well Fracture Intersection. Well-fracture intersections are modeled by assigning an effective well index for the fracture segments that intersect the well trajectory, as $$WI_f = \frac{2\pi k_f w_f}{\ln\left(\frac{re}{rw}\right)}, re = 0.14\sqrt{L_s^2 + H_s^2}, \quad (8)$$

where $k_f$ is the fracture permeability, $w_f$ is the fracture aperture, $L_s$ is the length of the fracture segment, $H_s$ is the height of the fracture segment, re is the effective radius, and rw is the wellbore radius.

III. Modeling of Complex Fracture Geometries

Nonplanar Fracture Geometry. Mathematically, the preprocessor calculates the intersection between a plane (fracture) and a cuboid (matrix cell). To account for the complexity in fracture shape, the EDFM may be extended to handle nonplanar fracture shapes by discretizing a nonplanar fracture into several interconnected planar fracture segments. The connections between these planar fracture segments may be treated as fracture intersections.

For two intersecting fracture segments, if the two subsegments have small areas (as depicted in FIG. 4B, $s_3 \to 0$, $s_4 \to 0$), the transmissibility factor between the fracture segments is primarily determined by subsegments with larger areas. In Equation 6, we will have $$d_{f1} = \frac{\int_{S_1} x_n dS_1}{S_1}, d_{f2} = \frac{\int_{S_2} x_n dS_2}{S_2}. \quad (9)$$

The formula for this intersecting transmissibility factor calculation (Tint) has the same form as that used for two fracture segments in an individual fracture (Equation 4a), with the permeability and the aperture of the two intersecting fractures being the same. This approach is used to model nonplanar fractures. FIG. 5 depicts how EDFM embodiments handle nonplanar fractures 18. The fracture 18 is discretized into six interconnected planar fractures. For each intersection, the ratios of L1/L3 and L2/L4 should be high enough to eliminate the influence of the small subsegments. In an exemplary embodiment, the ratios are set as 100.

Fractures with Variable Aperture. A fracture with variable apertures is modeled with the EDFM by discretizing it into connecting segments and assigning each segment an "average aperture" ($\overline{w_f}$) and "effective permeability" ($k_{f,eff}$). FIG. 6 shows a 2D case where a fracture 20 segment has a length of $L_s$ with variable aperture and x is the distance from a cross section to one end of the fracture segment. The aperture is a function of x. The total volume of the segment is $$V_{seg} = H \int_0^{L_s} w_f(x) dx, \quad (10)$$

where $\lambda$ is the height of the fracture segment. The average aperture to calculate the volume should be $$\overline{w_f} = V_{seg}/HL_s = \frac{1}{L_s} \int_0^{L_s} w_f(x) dx. \quad (11)$$

For transmissibility calculation, assuming the cubic law for fracture conductivity, $$C_f(x) = k_f(x) w_f(x) = \lambda w_f^3(x) \quad (12)$$

where $\lambda$ is $1/12$ for smooth fracture surfaces and $\lambda < 1/12$ for coarse fracture surfaces. For the fluid flow in fractures, based on Darcy's law, $$Q_j = HC_f(x)\lambda_j \frac{dP}{dx}, \quad (13)$$

where $Q_j$ is flow rate of phase j and $\lambda_j$ is the relative mobility of phase j. For each fracture segment, assuming constant $Q_j$, the pressure drop along the fracture segment is $$\Delta p = \int_0^{L_s} \frac{Q_j}{HC_f(x)} dx. \quad (14)$$

To keep the pressure drop constant between both ends of the segments, an effective fracture conductivity can be defined which satisfies the following equation:

$$\int_0^{L_s} \frac{Q_j}{HC_f(x)} dx = \int_0^{L_s} \frac{Q_j}{HC_f^{eff}(x)} dx, \quad (15)$$

which gives $$C_f^{eff} = \frac{L_s}{\int_0^{L_s} \frac{dx}{C_f(x)}} = \frac{L_s}{\int_0^{L_s} \frac{dx}{\lambda w_f^3(x)}}. \quad (16)$$

Since the fracture conductivity is the product of fracture aperture and fracture permeability, if $\overline{w_f}$ is used for the whole fracture segment, an effective fracture permeability $k_{f,eff}$ is required to calculate the conductivity:

$$k_{f,eff} = C_f^{eff}/\overline{w_f} = \frac{L_s^2}{\left(\int_0^{L_s} w_f(x) dx\right)\left(\int_0^{L_s} \frac{dx}{\lambda w_f^3(x)}\right)}. \quad (17)$$

Similarly, assuming constant fracture permeability but varying aperture, the effective fracture permeability should be $$k_{f,eff} = \frac{L_s^2}{\left(\int_0^{L_s} w_f(x) dx\right)\left(\int_0^{L_s} \frac{dx}{k_f w_j(x)}\right)}. \quad (18)$$

Special Handling of Extra Small Fracture Segments. In EDFM embodiments, the discretization of fractures by cell boundaries may generate some fracture segments with extremely small volumes. This happens frequently when modeling complex fracture geometries, where a large number of small fractures are used to represent the nonplanar shape and variation in aperture. These small control volumes may cause problems in preconditioning and they limit the simulation time step to an unreasonable value. Simply eliminating these segments may cause the loss of connectivity as depicted in FIGS. 7A and 7B. Lines 22 represent the fracture segments. In both FIGS. 7A and 7B, removing the fracture segment in Cell B will lead to loss of connectivity. For a fracture segment with extra small volume, if N denotes the number of NNCs related to this fracture segment, $C_1, C_2, \ldots C_N$ denotes the cells connected to this segment by NNC, and $T_1, T_2, \ldots T_N$ denotes the NNC transmissibility factor related to these connections, then the small segment can be eliminated as follows:

a) Remove the cell for this segment in the computational domain and eliminate all NNCs related to this cell.
b) Add N(N−1)/2 connections for any pair of cells in $C_1$, $C_2, \ldots C_N$, and the transmissibility between $C_i$ and $C_j$ is $$T_{i,j} = \frac{T_i T_j}{\sum_{k=1}^{N} T_k}. \quad (19)$$

This special case method eliminates the small control volumes while keeping the appropriate connectivity. However, for multiphase flow an approximation is provided as only the phase independent part of transmissibility is considered in the transformation. This method may also cause loss of fracture-well connection if applied for fracture segments with well intersections. Since this method ignores the volume of the small fracture segments, it is most applicable when a very high pore volume contrast (e.g. 1000) exists between fracture cells.

Figure 8:
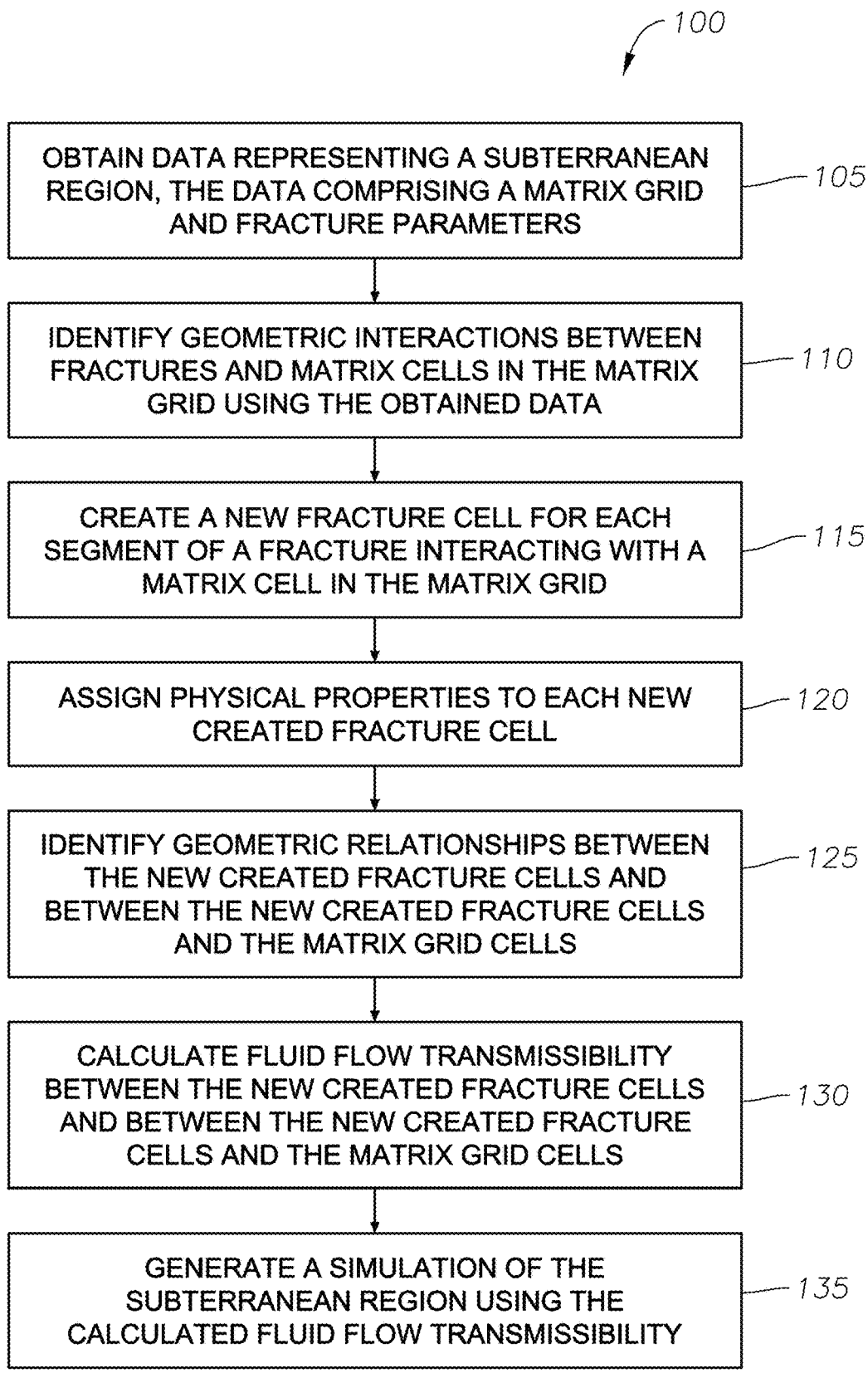
FIG. 8, in accordance with some embodiments of the present disclosure, depicts a flow chart illustrating a process for simulating a subterranean region having fracture geometries.

In accordance with some embodiments, FIG. 8 is a flow chart illustrating a process 100 for simulating a subterranean region having fracture geometries. At step 105, data representing a subterranean region is obtained, the data comprising a matrix grid and fracture parameters. As disclosed herein, the data set may be obtained as the output generated by a conventional commercial simulator or attained by other known means as known in the art, such as formation evaluation logging techniques, seismic surveys, cross-well surveys, etc. At step 110, geometric interactions between fractures and matrix cells in the matrix grid are identified using the obtained data. Full or partial fracture penetration of a matrix cell is determined for each individual fracture as disclosed herein. At step 115, a new fracture cell is created for each segment of a fracture interacting with a matrix cell in the matrix grid. This is performed in accordance with the disclosed techniques for creating new fracture cells. At step 120, physical properties are assigned to each new created fracture cell. As disclosed, this entails assignment of properties that may be associated with the respective cells (e.g., porosity, permeability, saturation, etc.). At step 125, geometric relationships are identified between the new created fracture cells and between the new created fracture cells and the original matrix grid cells. This entails identification of the NNCs as disclosed herein. When the data representing the subterranean region includes well parameters (e.g. vertical well, horizontal well, deviated well data), embodiments may be configured to include identification of the geometric relationships of interaction between fracture cells and well cells. At step 130, fluid flow transmissibility between the new created fracture cells and between the new created fracture cells and original matrix grid cells is calculated. This is performed according to the disclosed techniques, wherein the transmissibility between fracture cells within each single fracture and transmissibility between fracture cells within different fractures is calculated. When the data representing the subterranean region includes well parameters, embodiments may be configured to calculate an effective wellbore index for the interaction between fracture cells and well cells, as disclosed herein. At step 135, a simulation of the subterranean region is generated using the calculated fluid flow transmissibility, and the effective wellbore index if well data is processed.

Figure 9:
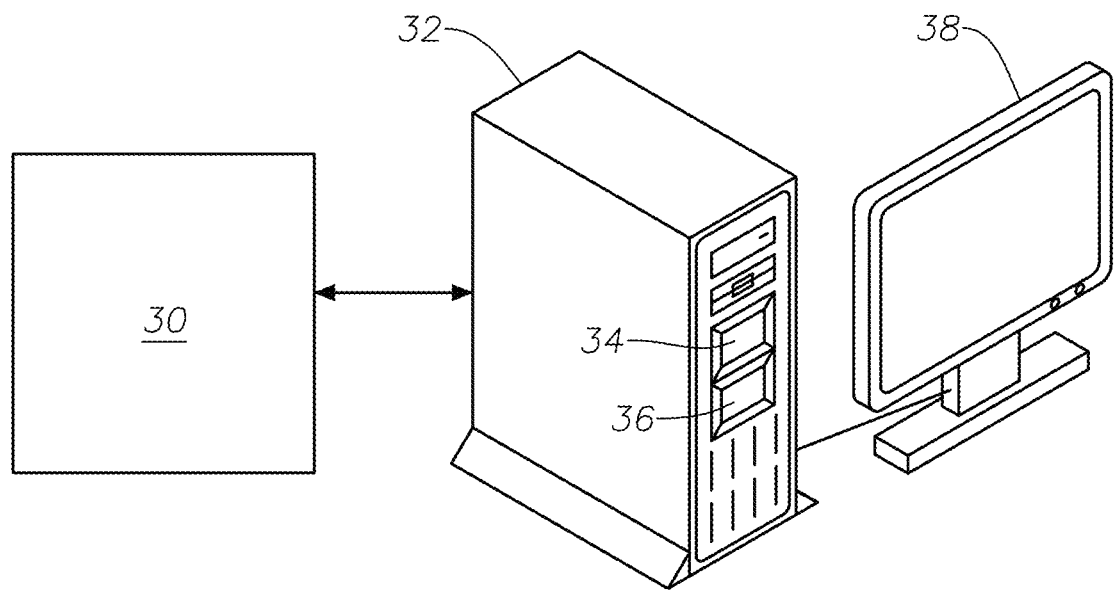
FIG. 9, in accordance with some embodiments of the present disclosure, depicts a system for simulating subsurface regions with complex fracture geometries.

As previously described, a preprocessor algorithm is used to perform the disclosed calculations. FIG. 9 depicts a system for implementation of some embodiments of this disclosure. A simulator module 30 is linked to a computer 32 configured with a microprocessor 34 and memory 36 that can be programmed to perform the steps and processes disclosed herein. The output values calculated by the computer 32 are used as data input (commonly referred to as "keywords") to the simulator module 30 for generation of the desired simulation. In this manner, the disclosed EDFM formulations are applied in a non-intrusive way in conjunction with conventional simulators with NNC functionality. The EDFM keeps the structured grids of conventional simulators and models the fractures implicitly through different types of connection factors as described herein, without requiring access to or use of the simulator's source code. Alternatively, some embodiments may be implemented as a unitary application (i.e. wherein one module performs both the simulator and preprocessor functions). A display 38 is linked to the computer 32 to provide a visual output of the simulation results. It will be appreciated by those skilled in the art that conventional software and computer systems may be used to implement the embodiments. It will also be appreciated that programming of the computer 32 and microprocessor 34 can be implemented via any suitable computer language coding in accordance with the techniques disclosed herein. In some embodiments, the simulator module 30 may be remotely located (e.g. at a field site) and linked to the computer 32 via a communication network.

Advantages provided by the embodiments of this disclosure include the ability to accurately simulate subsurface characteristics and provide useful data (e.g., fluid flow rates, fluid distribution, fluid saturation, pressure behavior, geothermal activity, well performance, formation distributions, history matching, production forecasting, saturation levels, sensitivity analysis, temperature gradients, etc.), particularly for multi-scale complex fracture geometries. The embodiments are ideal for use in conjunction with commercial simulators in a non-intrusive manner, overcoming key limitations of low computational efficiency and complex gridding issues experienced with conventional methods such as LGR modeling and unstructured gridding. 2D or 3D multi-scale complex fractures can be directly embedded into the matrix grids, including structured grids and unstructured grids. The EDFM formulations do not need an unstructured gridding technique with LGR to accurately model complex fracture geometries.

Figure 10:
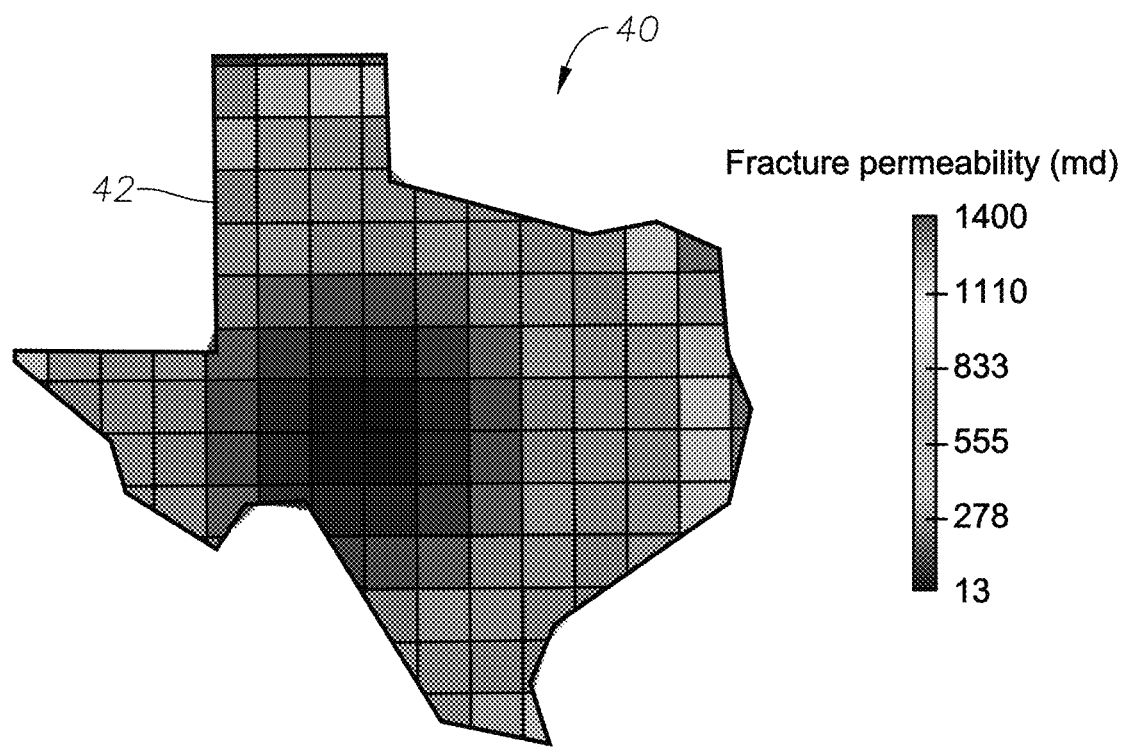
FIG. 10, in accordance with some embodiments of the present disclosure, depicts a simulation modeling a subterranean region with complex boundaries and a complex surface profile.

The EDFM embodiments of this disclosure can handle fractures with any complex boundaries and surfaces with varying roughness. It is common for fractures to have irregular shapes and varying properties (e.g. varying aperture, permeability) along the fracture plane. In such cases, the fracture shape can be represented using a polygon or polygon combinations to define the surface contours and performing the geometrical calculation between the fracture and the matrix block. The polygon(s) representing the fracture shape can be convex or concave. FIG. 10 depicts an exemplary simulation plot 40 produced with an EDFM embodiment of this disclosure. An overhead view of a Texas-shaped fracture 42 is depicted in FIG. 10, illustrating the complex boundary conditions that the EDFM can handle with high computational efficiency. The permeability of the fracture 42 varies along the fracture plane (parallel to the drawing page of FIG. 10). The complex surface permeability profile (in millidarcy units) along the fracture 42 plane is also depicted in FIG. 10, as produced by the EDFM.

Figure 11A:
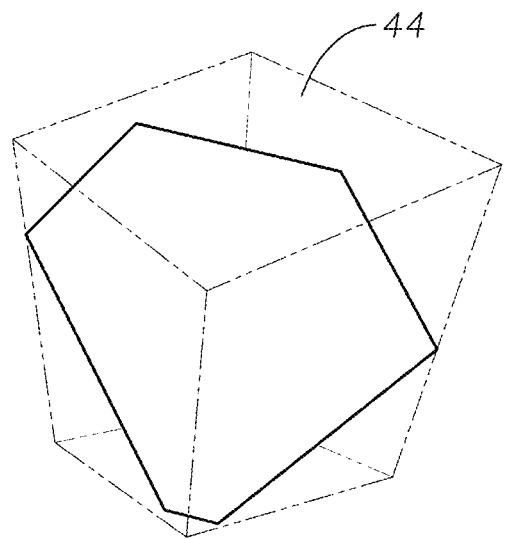
FIG. 11A, in accordance with some embodiments of the present disclosure, depicts a 3D gridblock of a corner-point fracture configuration.
Figure 11B:
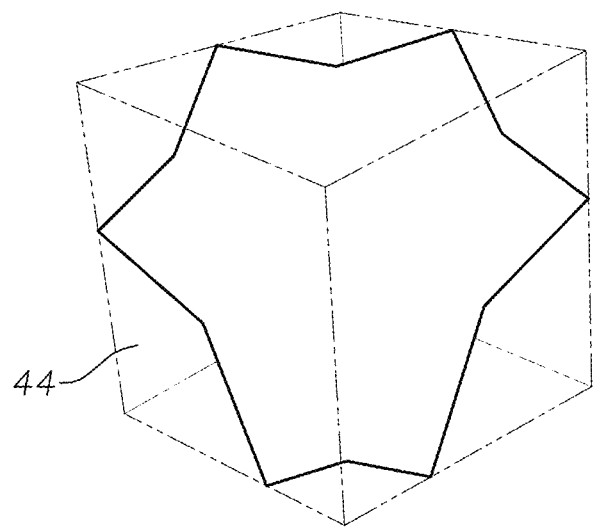
FIG. 11B, in accordance with some embodiments of the present disclosure, depicts another 3D gridblock of a corner-point fracture configuration.
Figure 12:
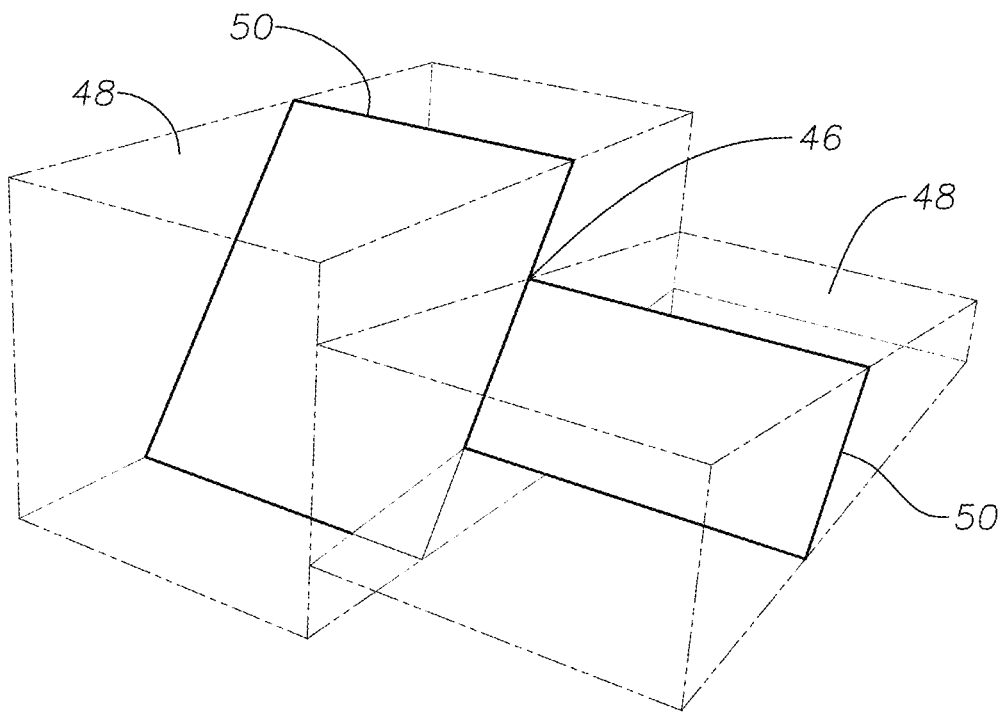
FIG. 12, in accordance with some embodiments of the present disclosure, depicts a 3D schematic of non-matching faces between neighboring gridblocks.
Figure 13:
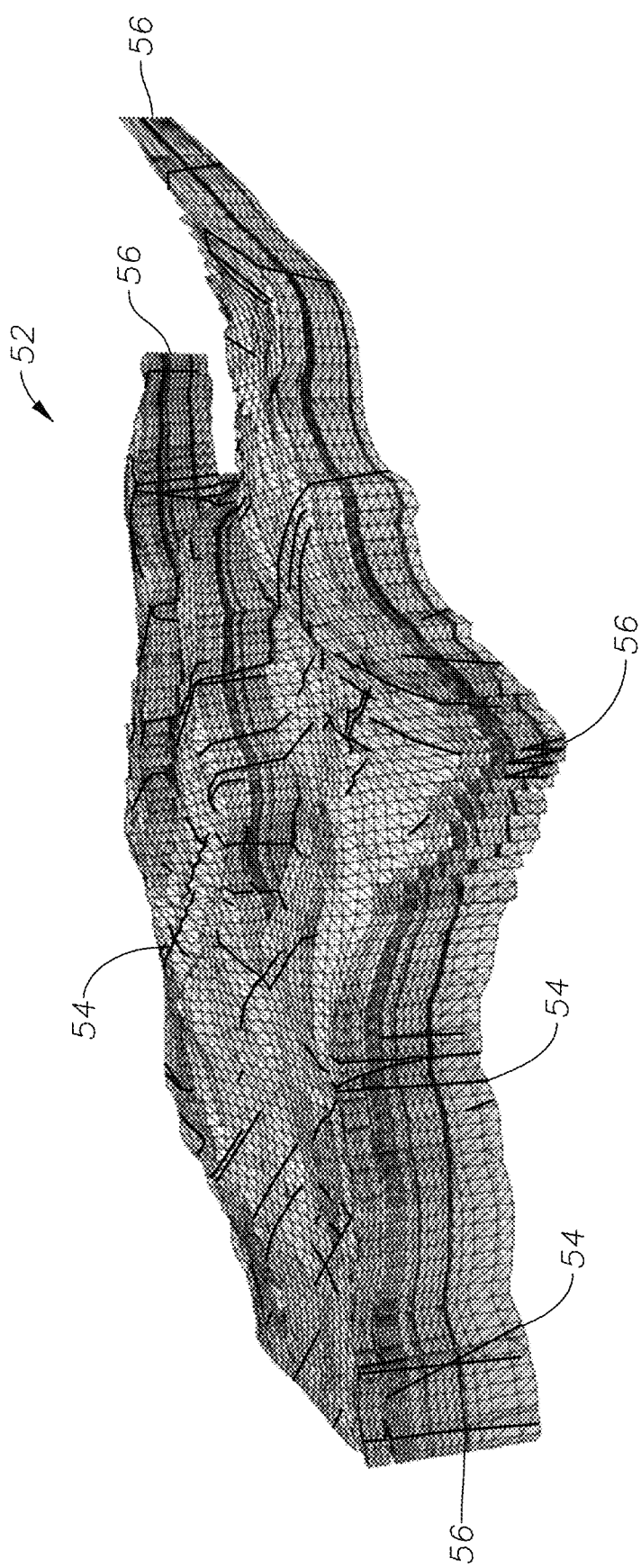
FIG. 13, in accordance with some embodiments of the present disclosure, depicts a simulation modeling a subterranean region with a multi-scale, complex fracture geometry.

EDFM embodiments of this disclosure handle different types of structured grids, including Cartesian grids and corner-point grids. The complexity of the geometrical calculations required for corner-point grids presents an obstacle for conventional simulators. For example, in a corner-point grid, the eight vertices of a gridblock are separately defined, which increases the geometrical complexity of the gridblock. When some block faces have four non-coplanar points, the gridblock will have more than six faces. FIGS. 11A and 11B depict sample corner-point gridblocks 44. Non-matching faces 46 between neighboring gridblocks 48 is also frequently encountered, wherein the fracture segments 50 may have partial overlap, as depicted in FIG. 12. FIG. 13 depicts a sample simulation 52 output modeling a subterranean region with a complex fracture geometry having 400 fractures 54. This simulation 52 illustrates the ability of the disclosed EDFM formulations to accurately model complex geometries with corner point 56.

Embodiments of this disclosure provide for simulation of processes entailing hydrocarbon production or enhanced oil recovery using compositional or black oil formulations. The embodiments can also handle single-phase, multiple-phase, isothermal and non-isothermal processes, single well, multiple wells, single porosity models, dual porosity models, and dual permeability models. Other advantages provided by the disclosed embodiments include the ability to: transfer the fracture geometry generated from microseismic data interpretation to commercial numerical reservoir simulators for production simulation; transfer the fracture geometry generated from fracture modeling and characterization software to commercial numerical reservoir simulators for production simulation; and handle pressure-dependent matrix permeability and pressure-dependent fracture permeability.

IV. Modelling Verification

A simulation study was performed with the embodiments of this disclosure. Seven cases were run to analyze the performance of the disclosed EDFM formulations. In the study, two commercial reservoir simulators (herein referred to as RS1 and RS2) were used to perform the analysis. Most of the reservoir properties and operation parameters were kept the same for the cases. However, for Cases 1, 2, and 6, subcase analyses were performed with some altered parameters. The accuracy of the models was demonstrated by a comparison of gas flow rates and pressure profiles of the EDFM against LGR models or a semi-analytical solution, which is provided in Appendix B. The studied cases were:

a) Case 1—Bi-wing fractures. An ideal case with four transverse planar fractures perpendicular to the wellbore. This case study demonstrated good matching of gas flow rates between the models. The study tested the type 1 and type 2 NNCs and showed that the EDFM gives consistent results with the LGR model for bi-wing fracture geometry.

b) Case 2—Complex orthogonal fractures. The operation of hydraulic fracturing may cause the reopening of pre-existing natural fractures, leading to a complex fracture network. In this case, intersecting orthogonal fractures were modeled. The EDFM handled the fracture intersections with finite fracture conductivity, illustrating that the EDFM accurately models complex fracture networks.

c) Case 3—Non-orthogonal fractures. During hydraulic fracturing, the fractures tend to grow in the direction perpendicular to the minimum horizontal stress. In some cases, when the well axis deviates from the direction of the minimum horizontal stress, the preferred direction of fracture propagation will not be perpendicular to the wellbore. This often leads to the propagation of non-orthogonal fractures. This case study showed close agreement between the pressure profiles and gas flow rate curves of the LGR model and the EDFM formulation, demonstrating the accuracy of the EDFM in modeling non-orthogonal fractures. By using the EDFM, the use of unstructured grids is avoided and conventional simulators are empowered to model non-orthogonal fractures accurately and effectively without having access to the simulator source code.

d) Case 4—Nonplanar fractures. The propagation of fractures can be controlled by several mechanisms. One of them is the stress interaction between growing fractures, which is commonly referred to as "stress shadow" effect. Owing to the effect, the fractures in a single fracturing stage may have different lengths, resulting in a nonplanar fracture shape. This case study demonstrated the accuracy of the EDFM in modeling non-orthogonal fractures. The EDFM modeled nonplanar fractures accurately and effectively using a general simulator.

e) Case 5—Complex nonplanar fractures with variable aperture. When the fractures are highly nonplanar and have a variable aperture along the length, LGR models have not be able to handle this case. However, the embedded nature of the disclosed EDFM embodiments provides the flexibility to model these fractures. In this case study, the EDFM successfully modeled the shape of the complex nonplanar fractures and demonstrated consistency with the semi-analytical model in gas flow rates.

f) Case 6—Shale gas production in a naturally fractured reservoir. The same grids and reservoir parameters as in Case 1 were used in this analysis. A fracture network including hydraulic fractures and natural fractures was modeled. The EDFM effectively modeled the fracture network and disconnected natural fractures, providing a powerful tool in rapid production analysis for highly fractured reservoirs.

g) Case 7—3D, three-phase, multi-component simulation. A compositional simulation with a reservoir having multiple layers. The EDFM formulations can be applied in 2D and 3D cases, and for both compositional and black-oil formulations. In this case study, The EDFM effectively modeled a 3D compositional simulation representing a typical field study.

V. CPU Time Comparison

Computational efficiency is an important factor in determining the applicability of a model. Table 1 summarizes the comparison of CPU time between the EDFM embodiments and LGR models for simulator RS1 that was used in the study described above.

TABLE 1

| Case | Model | $T_{total}$ (seconds) | $T_{nofrac}$ (seconds) | $T_{EDFM}/T_{LGR}$ | $N_m$ | $N_{extra}$ | Number of Newton Cycles |
|---|---|---|---|---|---|---|---|
| Case 1a | LGR | 18 | 7 | 1.28 | 19,800 | 392 | 141 |
|  | EDFM | 23 |  |  |  | 196 | 210 |
| Case 1b | LGR | 17 |  | 1.09 |  | 392 | 138 |
|  | EDFM | 19 |  |  |  | 196 | 137 |
| Case 2a | LGR | 52 |  | 0.87 |  | 802 | 328 |
|  | EDFM | 45 |  |  |  | 373 | 320 |
| Case 2b | LCR | 34 |  | 0.91 |  | 802 | 269 |
|  | EDFM | 31 |  |  |  | 373 | 218 |
| Case 3 | LGR | 7,676 | 46 | 0.05 | 139,600 | 9,696 | 2,253 |
|  | EDFM | 361 |  |  |  | 1,204 | 332 |
| Case 4 | LGR | 8,814 |  | 0.05 |  | 7,776 | 2,032 |
|  | EDFM | 466 |  |  |  | 984 | 383 |

In Table 1, $T_{total}$ is the CPU time for a respective case with an LGR model or an EDFM embodiment. $T_{nofrac}$ is the CPU time for the same case without fractures. $T_{EDFM}/T_{LGR}$ is the CPU time ratio of the EDFM to LGR model. $N_m$ is the total number of matrix cells. $N_{extra}$ is the extra number of grids introduced by EDFM or local grid refinement (in the LGR models).

It is evident that although $N_{extra}$ is much smaller than $N_m$, there is always a large increase in CPU time after introducing the extra grids. Therefore, these extra cells play an important role in limiting CPU efficiency. For orthogonal cases (Case 1 and Case 2), the fractures can be precisely modeled by local grid refinement, but the number of extra cells in the LGR model is higher than that in the EDFM formulation. As the number of extra cells increases, EDFM has better performance than the LGR models in Cases 2a and 2b. For non-orthogonal or nonplanar fracture cases (Case 3 and Case 4), to approximate an incline angle, the LGR model requires a greater number of extra cells due to grid refinement. Additionally, for LGR models, the small control volumes at fracture intersections undermine the simulation time step. As a result, the EDFM formulations have a great advantage over LGR models with regard to CPU performance. The EDFM formulations are also flexible in modeling irregular fracture shapes (e.g. corner point grids, unstructured grids, variable apertures), which is very challenging for the LGR model.

The study comparisons illustrate the difference between the EDFM and the LGR model. For the LGR model, a large number of extra cells are required around the fractures to model the complex fracture shape, leading to a high computational cost. However, the disclosed EDFM embodiments avoid this problem by handling the connections mathematically without losing accuracy. All of the case studies we performed using both simulators RS1 and RS2. The EDFM CPU time for all cases with simulators RS1 and RS2 are summarized in Table 2. In both simulators, the EDFM shows high computational performance.

TABLE 2

| | Case | | | | | | | | | |
|---|---|---|---|---|---|---|---|---|---|---|
| | Case 1a | Case 1b | Case 2a | Case 2b | Case 3 | Case 4 | Case 5 | Case 6a | Case 6d | Case 7 |
| $T_{total}$ of RS1 (seconds) | 23 | 19 | 45 | 31 | 361 | 466 | 41 | 60 | 102 | 3995 |
| $T_{total}$ of RS2 (seconds) | 7 | 4 | 5 | 4 | 64 | 40 | 4 | 18 | 20 | 2921 |

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in an embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered. This disclosure describes one or more embodiments wherein various operations are performed by certain systems, applications, modules, components, etc. In alternative embodiments, however, those operations could be performed by different components. Also, items such as applications, modules, components, etc., may be implemented as software constructs stored in a machine accessible storage medium, such as an optical disk, a hard disk drive, etc., and those constructs may take the form of applications, programs, subroutines, instructions, objects, methods, classes, or any other suitable form of control logic; such items may also be implemented as firmware or hardware, or as any combination of software, firmware and hardware, or any combination of any two of software, firmware and hardware. It will also be appreciated by those skilled in the art that embodiments may be implemented using conventional memory in applied computing systems (e.g., local memory, virtual memory, and/or cloud-based memory). The term "processor" may refer to one or more processors.

This disclosure may include descriptions of various benefits and advantages that may be provided by various embodiments. One, some, all, or different benefits or advantages may be provided by different embodiments. In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

Nomenclature
A=area, ft
B=formation volume factor
c=compressibility, psi$^{-1}$
$C_f$=fracture conductivity, md-ft
d=average distance, ft
dS=area element, ft$^2$
dV=volume element, ft$^3$
H=fracture height, ft
$H_s$=height of fracture segment, ft
k=reservoir permeability, md
$k_f$=fracture permeability, md
K=matrix permeability tensor, md
$K_\alpha$=differential equilibrium portioning coefficient of gas at a constant temperature
L=fracture length, ft
$L_{int}$=length of fracture intersection line, ft
$L_s$=length of fracture segment, ft
$\vec{n}$=normal vector
N=number of nnc
p=pressure, psi
Q=volume flow rate, ft$^3$/day
re=effective radius, ft
rw=wellbore radius, ft
$R_s$=solution gas-oil ratio, scf/STB
S=fracture segment area, ft$^2$
T=transmissibility, md-ft or temperature, ° F.
V=volume, ft$^3$
$V_b$=bulk volume, ft$^3$
$V_m$=langmuir isotherm constant, scf/ton
$w_f$=fracture aperture, ft
$\overline{w}_f$=average fracture aperture, ft
WI=well index, md-ft x=distance, ft
x$_f$=fracture half length, ft
Δp=pressure drop, psi
Δ=phase mobility, cp$^{-1}$
μ=viscosity, cp
ρ=density, g/cm$^3$
φ$_f$=fracture effective porosity
Subscripts and Superscripts
  a=adsorbed
  b=bulk
  c=common face
  eff=effective
  f=fracture
  g=gas
  j=phase
  L=Langmuir
  m=matrix
  o=oil
  seg=fracture segment
  ST=stock tank
Acronyms
  EDFM=Embedded Discrete Fracture Model
  LGR=Local Grid Refinement
  NNC=Non-Neighboring Connection
  2D=Two-dimension(al)
  3D=Three-dimension(al)

APPENDIX A

Derivation of Matrix-Fracture Transmissibility Factor

As shown in FIG. 2, the matrix cell is divided into 2 parts: A and B. We denote the volume of part A and part B as $V_A$ and $V_B$, respectively. The average pressure in the total matrix cell is $$p_m = (V_A p_A + V_B p_B)/(V_A + V_B), \quad (A1)$$

where $p_A$ and $p_B$ are the average pressure in part A and B, respectively. We assume the same pressure gradients in A and B as shown by the red arrows. Let $d_A$ and $d_B$ be the average normal distances from part A and part B to the fracture plane. The flow rate of phase j from the fracture surface 1 to part A is $$Q_{f-A} = T_{f-A} \lambda_j (p_f - p_A), \quad (A2)$$

where $p_f$ is the average pressure in the fracture segment, $T_{f-A}$ is the phase independent part of transmissibility between fracture and part A, and $\lambda_j$ is the relative mobility of phase j. $T_{f-A}$ can be calculated by $$T_{f-A} = A_f (K \cdot \vec{n}) \cdot \vec{n}/d_{f-A}, \quad (A3)$$

where $A_f$ is the area of the fracture segment on one side, K is the matrix permeability tensor, $\vec{n}$ is the normal vector of the fracture plane, $d_{f-A}$ is the average normal distance from part A to fracture, which can be calculated by $$d_{f-A} = \frac{\int_{V_A} x_n dV_A}{V_A}, \quad (A4)$$

$(p_f - p_A)\vec{n}/d_{f-A}$ is the pressure gradient. In the case of anisotropic matrix permeability, the flow direction may be different from the direction of pressure gradient. Therefore, the second $\vec{n}$ in the equation projects the flow velocity onto the normal direction of the fracture plane. Similarly, the flow rate of phase j from the fracture surface 2 to part B is $$Q_{f-B} = T_{f-B} \lambda_j (p_f - p_B), \quad (A5)$$

$$T_{f-B} = A_f (K \cdot \vec{n}) \cdot \vec{n}/d_{f-B}, \text{ and} \quad (A6)$$

$$d_{f-B} = \frac{\int_{V_B} x_n dV_B}{V_B}. \quad (A7)$$

The total flow from fracture to matrix is $$Q_{f-m} = Q_{f-A} + Q_{f-B}. \quad (A8)$$

By the definition of $T_{f-m}$, $$Q_{f-m} = T_{f-m} \lambda_j (p_f - p_m). \quad (A9)$$

Assuming the same magnitude of pressure gradients on both sides of the fracture, we have $$\frac{p_f - p_A}{p_f - p_B} = \frac{d_{f-A}}{d_{f-B}}. \quad (A10)$$

Combining all these equations, we can obtain $$T_{f-m} = \frac{2 A_f (K \cdot \vec{n}) \cdot \vec{n}}{(V_A d_{f-A} + V_B d_{f-B})/(V_A + V_B)}. \quad (A11)$$

APPENDIX B

A Semi-Analytical Model

In this study, a semi-analytical solution was used to verify the disclosed modelling for the non-planar fracture geometry with varying fracture aperture and fracture permeability along fracture length. The semi-analytical model discretizes the non-planar fracture geometry into a number of small fracture segments. It mainly consists of two parts for simulating shale gas production. First, an analytical solution is used to solve the diffusivity equation for gas transport in shale. Second, a numerical solution is used to solve gas flow in each fracture segment. Below we briefly introduced the fundamental equations for gas transport in shale and gas flow in fracture.

The diffusivity equation of conventional gas reservoirs is modified by considering the gas desorption effect for modeling gas transport in shale as follows:

$$\left[ \frac{\partial}{\partial x}\left(\frac{\rho_g k}{\mu_g}\frac{\partial p}{\partial x}\right) + \frac{\partial}{\partial y}\left(\frac{\rho_g k}{\mu_g}\frac{\partial p}{\partial y}\right) + \frac{\partial}{\partial z}\left(\frac{\rho_g k}{\mu_g}\frac{\partial p}{\partial z}\right) \right] = [S_g \phi + (1-\phi)K_a]c_g \rho_g \frac{\partial p}{\partial t}, \quad (B1)$$

where $\rho_g$ is gas density, φ is rock porosity, k is reservoir permeability, $c_g$ is the isothermal gas compressibility factor, p is pressure, $\mu_g$ is gas viscosity, $K_a$ is the differential equilibrium portioning coefficient of gas at a constant temperature, which is function of pressure and temperature and defined as $$K_a = \left(\frac{\partial \rho_a}{\partial \rho_g}\right)_T, \quad (B2)$$

where $\rho_a$ is the adsorbed gas mass per unit shale volume (kilograms of adsorbed gas per cubic meter of a solid). In this study, the Langmuir isotherm was used to model the gas desorption effect:

$$v = \frac{pv_L}{p + p_L}, \quad (B3)$$

where $v_L$ is Langmuir volume and $p_L$ is Langmuir pressure. According to the form of Langmuir isotherm, the differential equilibrium partitioning coefficient of gas can be expressed as $$K_a = \frac{\rho_g(p_{ST}, T_{ST})\rho_b}{c_g \rho_g (1-\phi)} \frac{v_L p_L}{(p_L + p)^2}, \quad (B4)$$

where $\rho_b$ is bulk density of shale and $\rho_g$ ($p_{ST}$, $T_{ST}$) is the stock tank gas density.

For gas flow in the fracture, the pressure drop along the j-th fracture segment is proportional to the fluid velocity and can be calculated as $$p_j - p_{j+1} = \int_{y_j}^{y_{j+1}} (\mu_g / \rho_g k_f w_f h_f)_j [q_j + q_{fj}(y - y_j)] dy, \quad (B5)$$

where $k_f$ is fracture permeability, $w_f$ is fracture aperture, $h_f$ is fracture height, $q_j$ is gas flow rate at the node j of the j-th fracture segment, and $q_{fj}$ is the flux of the j-th fracture segment. Additionally, the mass balance is satisfied for each intersection point of fracture segments.

What is claimed is:

1. A method for simulating a subterranean region having fracture geometries, comprising:
   obtaining data produced by a simulator module, the data representing the subterranean region and comprising matrix grid data and parameters associated with fractures in the subterranean region;
   in a computational domain separate from the simulator module, using the obtained data produced by the simulator module to produce a matrix grid by:
      identifying geometric interactions between fractures and matrix cells in the matrix grid;
      creating a new fracture cell for each segment of a fracture interacting with a matrix cell in the matrix grid;
      creating at least one null cell in the matrix grid to maintain the same number of cells in a row or column of the matrix grid as needed;
      cancelling at least one grid cell connection from the obtained data produced by the simulator module;
      assigning physical properties to each new created fracture cell;
      identifying geometric relationships between the new created fracture cells and between the new created fracture cells and the matrix cells; and
      calculating fluid flow transmissibility factors between the new created fracture cells and between the new created fracture cells and the matrix cells;
   inputting the calculated fluid flow transmissibility factors into the simulator module;
   generating a simulation of the subterranean region with the simulator module using the calculated fluid flow transmissibility factors.

2. The method of claim 1, wherein the identifying geometric relationships between the new created fracture cells and between the new created fracture cells and the matrix cells comprises identifying non-neighboring connections.

3. The method of claim 2, wherein the identifying geometric interactions, creating new fracture cells, creating at least one null cell, cancelling at least one grid cell connection, assigning physical properties to the new fracture cells, identifying geometric relationships, and calculating fluid flow transmissibility factors is all performed via a preprocessor configured to generate corresponding output values.

4. The method of claim 3, wherein the output values generated by the preprocessor are input into the simulator module to generate the simulation of the subterranean region.

5. The method of claim 1, wherein the identifying geometric relationships between the new created fracture cells comprises identifying connections between the new created fracture cells corresponding to the same fracture.

6. The method of claim 1, wherein the identifying geometric relationships between the new created fracture cells comprises identifying connections between the new created fracture cells corresponding to different fractures.

7. The method of claim 1, wherein producing the matrix grid further comprises discretizing nonplanar fractures into multiple interconnected planar fracture segments.

8. The method of claim 1, wherein:
   the obtained data produced by the simulator module includes well parameters;
   producing the matrix grid further comprises calculating a well index between the new created fracture cells and wellbore cells associated to the well parameters;
   and the generating the simulation of the subterranean region includes using the calculated well index.

9. The method of claim 8, wherein producing the matrix grid further comprises:
   identifying geometric interactions between fractures and the wellbore cells;
   and adding a well location to the new created fracture cells for each segment of a fracture interacting with a wellbore cell.

10. The method of claim 1, wherein the generating a simulation of the subterranean region comprises generation of a geometry including at least one of: (i) a complex boundary, (ii) a complex surface, or (iii) a corner point.

11. A system for simulating a subterranean region having fracture geometries, comprising:
    at least one processor;
    a memory linked to the processor, the memory having instructions stored therein, which when executed by the processor cause the processor to perform functions including to:
       input data produced by a simulator module, the data representing the subterranean region and comprising matrix grid data and parameters associated with fractures in the subterranean region;
       produce a matrix grid using the input data to:
          identify geometric interactions between fractures and matrix cells in the matrix grid;

create a new fracture cell for each segment of a fracture interacting with a matrix cell in the matrix grid;

create at least one null cell in the matrix grid to maintain the same number of cells in a row or column of the matrix grid as needed;

cancel at least one grid cell connection from the input data produced by the simulator module;

assign physical properties to each new created fracture cell;

identify geometric relationships between the new created fracture cells and between the new created fracture cells and the matrix cells;

calculate fluid flow transmissibility factors between the new created fracture cells and between the new created fracture cells and the matrix cells;

input the calculated fluid flow transmissibility factors into the simulator module; and generate a simulation of the subterranean region with the simulator module using the calculated fluid flow transmissibility factors.

12. The system of claim 11, wherein the function to identify geometric relationships between the new created fracture cells and between the new created fracture cells and the matrix cells comprises identification of non-neighboring connections.

13. The system of claim 12, wherein the functions performed by the processor further include functions to produce output values corresponding to the identified geometric interactions, the new created fracture cells, each at least one created null cell, the assigned physical properties, the identified geometric relationships, and the calculated fluid flow transmissibility factors.

14. The system of claim 13, wherein the functions performed by the processor further include functions to input the produced output values into the simulator module to generate the simulation of the subterranean region.

15. The system of claim 11, wherein the function to identify geometric relationships between the new created fracture cells comprises identification of connections between the new created fracture cells corresponding to the same fracture.

16. The system of claim 11, wherein the function to identify geometric relationships between the new created fracture cells comprises identification of connections between the new created fracture cells corresponding to different fractures.

17. The system of claim 11, wherein the function to produce a matrix grid further includes functions to discretize nonplanar fractures into multiple interconnected planar fracture segments.

18. The system of claim 11, wherein the function to produce the matrix grid further includes functions to:
input data produced by the simulator module including well parameters;
calculate a well index between the new created fracture cells and wellbore cells associated to the well parameters; and
the function to generate a simulation of the subterranean region includes a function to use the calculated well index to generate the simulation.

19. The system of claim 18, wherein the function to produce the matrix grid further includes functions to:
identify geometric interactions between fractures and the wellbore cells; and
add a well location to the new created fracture cells for each segment of a fracture interacting with a wellbore cell.

20. The system of claim 11, wherein the function to produce the matrix grid further includes functions to:
discretize fractures with variable apertures into connecting segments; and
assign each segment an average aperture value and a permeability value.

21. The system of claim 11, wherein the function to generate a simulation of the subterranean region comprises generation of a geometry including at least one of: (i) a complex boundary, (ii) a complex surface, or (iii) a corner point.

* * * * *